UNITED STATES PATENT OFFICE.

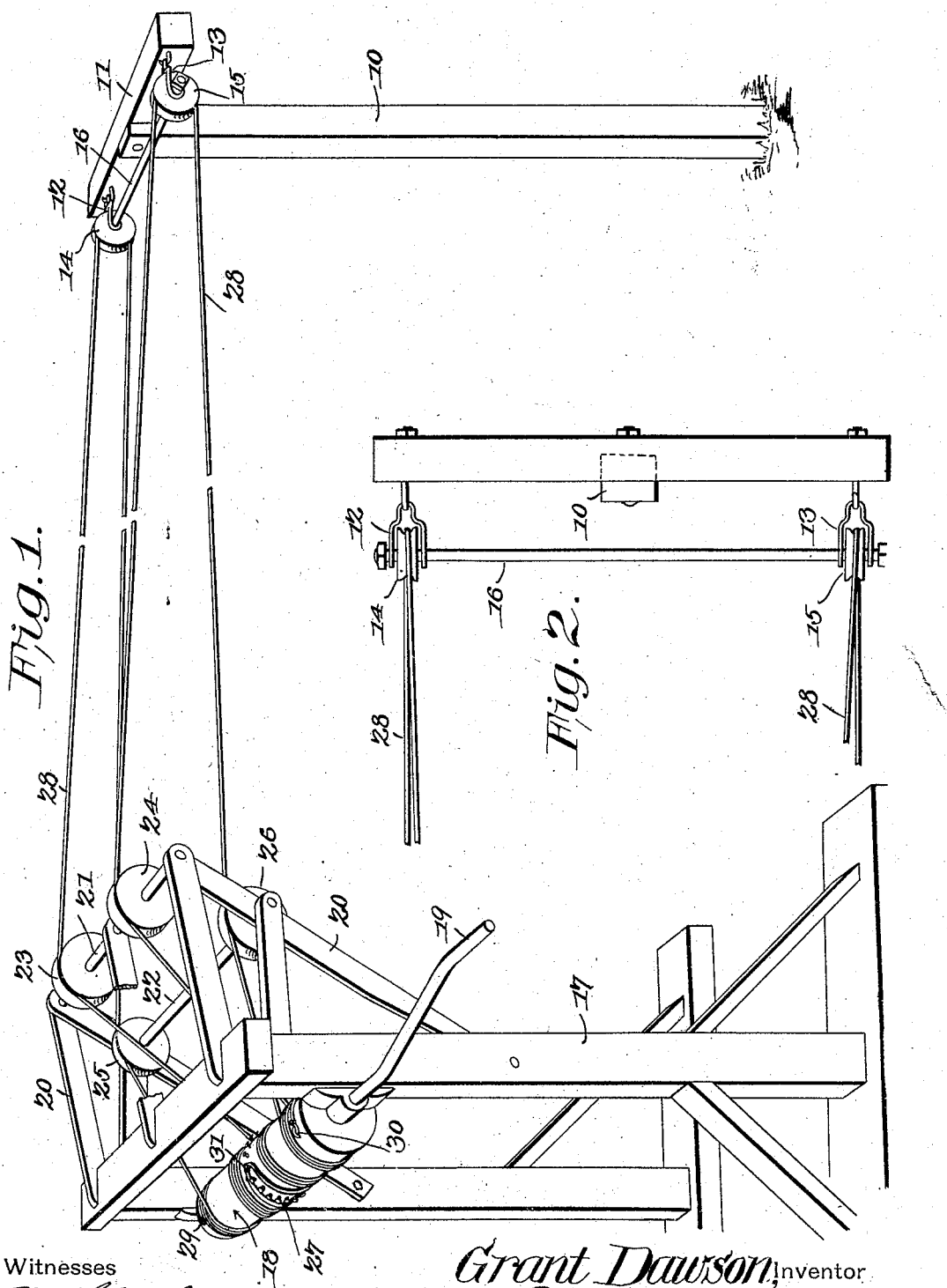

GRANT DAWSON, OF STREET, MARYLAND.

CLOTHES-LINE APPARATUS.

No. 806,401.     Specification of Letters Patent.     Patented Dec. 5, 1905.

Application filed March 25, 1905. Serial No. 252,013.

*To all whom it may concern:*

Be it known that I, GRANT DAWSON, a citizen of the United States, residing at Street, in the county of Harford and State of Maryland, have invented a new and useful Clothes-Line Apparatus, of which the following is a specification.

This invention relates to apparatus for supporting clothes-lines, and has for its object to simplify and improve the construction and increase the efficiency of apparatus of this character.

With this and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation.

In the drawings thus employed, Figure 1 is a perspective view of the improved apparatus. Fig. 2 is a plan view, enlarged, of the outer end of the device.

The improved apparatus comprises two supporting means disposed at opposite ends of the field of operations of the same and may be of any required size or structure and spaced any distance apart. The spaced members may be attached to oppositely-disposed buildings or to posts rising from the ground at opposite sides of the drying-yard or otherwise disposed as circumstances or the conditions of the locality where the apparatus is erected may require. For the purpose of illustration an improved construction of the supporting means is shown, the means at one end consisting of a post 10, having a crossbeam 11, carrying spaced yoke-frames 12 13, in which cable guide-pulleys 14 15 are mounted for rotation on a rod 16, the one rod thus serving as a bearing for both the pulleys. The supporting means at the other side of the field comprises a frame 17, carrying a drum 18 for rotation, as by a crank 19, and with brackets 20, carrying two shafts 21 22, the latter in turn having spaced cable guide-pulleys 23 24 and 25 26. The drum 18 is provided at the center with a plurality of spaced radial pins 27.

The "clothes-line" will preferably be of metal possessing sufficient flexibility to readily pass around the drum and guide-pulleys, and is indicated as a whole at 28, and is connected by the ends, as at 29 30, to the drum and passes thence around the drum in one direction and over the guide-pulleys 25 26, and thence around the guide-pulleys 14 15, and thence back around the guide-pulleys 23 24, and thence around the drum from the opposite side and engaged by the "bight" of the line or cable to one of the radial pins 27, as at 31. When installing the apparatus, enough surplus line will be wound upon the drum 18 to correspond to the distance between the end supporting means, so that when the drum is rotated in one direction the line will be wound upon one part of the drum and unwound from the other part, as will be obvious.

The supporting means 17, carrying the drum 18, will be located convenient to the locality where the garments are to be attached to the line, as by clothes-pins, in the usual manner, and the portions of the line extending between the guide-pulleys 25 and 14 and between the pulleys 26 and 15 will be thus utilized, and as fast as the garments are attached the drum 18 will be rotated and the garments carried along until the "lines" are full. In removing the garments the operation is reversed, as will be obvious.

When the lines become slack from any cause, the slack can be readily taken up by setting the bight 31 of the same over another of the pins 27, the pins thus serving as an effective means for adjusting the tension, as will be obvious.

The cable guide-pulleys 23 24 being disposed above and nearer together than the cable guide-pulleys 25 26 carry the return portions of the line above and inwardly from the operative portions of the line and guide the same centrally to the drum 18, and thus prevent entanglement of the lines or interference with the garments being dried.

The apparatus is simple in construction, can be inexpensively manufactured, and can be readily installed in any locality where such a device is required.

Having thus described the invention, what is claimed is—

1. A device of the class described, comprising spaced guide-pulleys disposed at one end and a drum mounted for rotation at the other end of the field of operations of the device, said drum having spaced pins extending radially therefrom, and a cable connected by the ends to said drum and leading from one end of the same around said guide-pulleys and back to said drum and connected to the opposite side of the same by engaging the bight of the cable with one of said radial pins.

2. In a device of the class described, spaced supports disposed at the ends of the field of operations of said device, spaced guide-pulleys connected to one of said supports, a drum mounted for rotation upon the other of said supports, supporting-brackets connected to the support carrying said drum, a plurality of spaced guide-pulleys carried by said brackets, a cable connected by the ends to said drum and leading from one side of the same and over two of the pulleys upon said brackets and around the pulleys on one of said spaced supports and back over the other two of the pulleys carried by said brackets and connected to the opposite side of the drum by the bight of the cable.

In testimony that I claim the foregoing as my own I have hereto affixed my signature in the presence of two witnesses.

GRANT DAWSON.

Witnesses:
 WALTON M. TORRELL,
 CHARLES E. JACKSON.